ns Patent Office 2,851,371
Patented Sept. 9, 1958

2,851,371

PHTHALOCYANINE PIGMENTED NITRO-
CELLULOSE LACQUERS

Byron T. Stephens, Dearborn, Mich., assignor to Pittsburgh Plate Glass Company, Allegheny County, Pa., a corporation of Pennsylvania No Drawing. Application February 4, 1954
Serial No. 408,292

2 Claims. (Cl. 106—193)

This invention relates to novel coating compositions, and pertains more particularly to phthalocyanine pigmented nitrocellulose lacquers containing benzyl cellulose as an agent for preventing flocculation or separation of the phthalocyanine pigment and striation of the lacquer coating composition.

The utilization of light blue and green lacquers obtained by the use of phthalocyanine pigments has increased tremendously in recent years, particularly in the automotive industry where the trend to lighter colors has predominated, and where the outstanding outdoor durability of phthalocyanine pigmented coating compositions is a highly desired characteristic.

However, phthalocyanine pigments possess one serious disadvantage in that they characteristically separate or flocculate from lacquer coating compositions within a short time, with the result that the composition possesses striations, and films prepared therefrom are off color due to the fact that a portion of the phthalocyanine tinting strength is lost. This is a particularly objectionable feature in automotive finishing and refinishing where exacting color matches are required and where the coating compositions, particularly in the refinishing industry, may be stored for relatively long periods before use.

Many attempts have been made to overcome the flocculation and separation characteristics of phthalocyanine pigments. One method which accomplishes the desired result consists in agitating or stirring the coating composition continuously; obviously, however, this method requires expensive equipment and is not practical in small refinishing operations. Dispersing agents and surface-active wetting agents have also been added to prevent separation of the phthalocyanine pigment, but no substantial improvement is obtained. Coating of the phthalocyanine pigment particles with polymeric materials such as vinyl chloride resin also gives no substantial improvement. Attempts have also been made to overcome the settling and flocculation characteristics by adjusting the pH of the coating composition by the addition of acidic or basic materials, but without success.

More recently, certain specific cellulosic esters, particularly methyl cellulose, dynamite cellulose nitrate, and ethyl cellulose have been employed to prevent separation and flocculation of the phthalocyanine pigment particles. Both methyl cellulose and dynamite cellulose nitrate do prevent separation and flocculation for short periods of time, but not long enough to serve in ordinary commercial usage. Moreover, methyl cellulose, which is substantially insoluble in lacquer solvents, but dispersible in water, can be used only where an aqueous dispersion can be tolerated, and is obviously of limited application. Ethyl cellulose, on the other hand, prevents flocculation and separation for sufficient periods of time, but only when used in relatively small amounts. When used in amounts in excess of about 4.0 percent by weight based on the total weight of the coating composition, it has been found that ethyl cellulose actually causes certain white pigments, for example, rutile titanium dioxide pigment, in the lacquer coating composition to flocculate and separate, thus destroying the usefulness of the coating composition. Also, ethyl cellulose should be added to the lacquer in the final mixing stage, that is, when the various tinting lacquers are mixed together, if control over the amount of agent to be added to the product is to be achieved.

It has now been discovered that all of the above disadvantages can be overcome by incorporating benzyl cellulose into the lacquer coating composition. By using benzyl cellulose in the coating composition, nitrocellulose lacquers are obtained which show substantially no flocculation, separation or striation after months of storage, and any minor flocculation, separation or striation which may occur can readily be overcome by simple agitation. In this manner, exacting color matches are nearly always assured regardless of the shelf storage time. Moreover, amounts of benzyl cellulose as high as 7.0 percent by weight or even more, based on the total weight of the coating composition, may be incorporated in the coating composition without causing flocculation or separation of the white or other pigments in the composition, this constituting a substantial improvement over the use of ethyl cellulose. Consequently, the formulator may utilize large amounts of benzyl cellulose without destroying the desirable non-flocculating, non-striating effects thereof. This is obviously not true when ethyl cellulose is used.

The benzyl cellulose which is employed to prevent flocculation or separation of the phthalocyanine pigment in nitrocellulose lacquers in accordance with the present invention is readily prepared by the reaction of benzyl chloride with alkali cellulose, and may be of any desired benzoxyl content. A low or medium viscosity is preferred, and one particularly desirable benzyl cellulose has a specific gravity at 20° C. of 1.230, a refractive index at 20° C. of 1.604, and a melting point of 148° C. to 155° C. The manner and time of adding the benzyl cellulose to the nitrocellulose lacquer coating composition is not critical and may be varied widely. It is preferred to add the benzyl cellulose when the tinting lacquers are mixed together; however, the benzyl cellulose may be mixed with the phthalocyanine pigments when the dispersion is prepared, or it may be added to the white pigment dispersion (or other color pigment dispersion) which can then be added to the phthalocyanine pigmented lacquer. For convenience, the benzyl cellulose is desirably added as a solution in a suitable solvent, for example as a 20 percent solution in butyl acetate.

The quantity of benzyl cellulose utilized may also be varied widely. For example, amounts as low as about 0.2 percent by weight, based on the total weight of the lacquer coating composition, to 7.0 percent or more may be utilized to obtain a phthalocyanine pigmented lacquer which is substantially free of separation or flocculation of the phthalocyanine pigment, striation of the lacquer, and resultant mottling and off-color film formation. The larger amounts, for example, 2.0 percent or more, do not produce significant changes in the non-flocculating, non-striating characteristics of the lacquer, but in some instances, it may be desired to add larger amounts in order to obtain the characteristics which the benzyl cellulose imparts to the lacquer film.

The beneficial effect of using benzyl cellulose in a phthalocyanine pigmented coating composition occurs regardless of the particular phthalocyanine pigment employed. Metal complexes of the phthalocyanines, and chlorinated metal complexes, as well as metal-free complexes may be employed either in the form of toners or phthalocyanine lakes.

The lacquers which contain phthalocyanine pigments ordinarily also contain substantial quantities of titanium dioxide pigments. However, the phthalocyanine pigmented lacquers can also be utilized with other tinting lacquers containing pigments such as finely divided metallic aluminum, carbon black, chrome green, gold paste, and the like. It is to be understood, of course, that the phthalocyanine lacquers may be used without being shaded.

It has been found that any nitrocellulose may be used in the vehicle. In automotive lacquers it is desired that either one-fourth or one-half second nitrocellulose be employed, although for other applications, it is possible to use other classes of nitrocellulose; for example, in toy lacquers, even a 15 second nitrocellulose can be used with good results.

The following examples illustrate the outstanding results obtained by utilizing benzyl cellulose to prevent flocculation and striation in phthalocyanine pigmented nitrocellulose lacquers. The examples are not intended to limit the invention, however, for there are, of course, numerous possible variations and modifications. In the examples all parts are by weight.

Example I

A phthalocyanine lacquer pigmented with titanium dioxide was prepared according to the following formulation:

| | Parts |
|---|---|
| ¼ second nitrocellulose (70% total solids) | 20.2 |
| Dibutyl phthalate | 3.2 |
| Short oil length coconut alkyd (50% solids in toluol) | 27.8 |
| Blown castor oil | 3.8 |
| Rutile titanium dioxide | 5.0 |
| Phthalocyanine green pigment | 0.3 |
| Toluol | 12.0 |
| Xylol | 3.0 |
| Hexone | 17.7 |
| Isopropyl acetate | 7.2 |
| | 100.0 |

To the resulting lacquer 0.5 part by weight of benzyl cellulose having a specific gravity at 20° C. of 1.230, a refractive index at 20° C. of 1.604 and a melting point of 148° C. to 155° C. was added as a 20 percent solution in butyl acetate. The resulting lacquer composition exhibited no flocculation or striation after shelf storage of more than one year. The stored sample was then applied to a metal panel and baked. The panel matched very satisfactorily a panel having a baked film of a similar lacquer prepared and immediately applied to the panel.

A control sample containing no benzyl cellulose showed substantial flocculation and striation after only several hours storage.

Example II

To a sample of the basic lacquer composition prepared as in Example I, 7.0 parts (7.0 percent) by weight of benzyl cellulose were added. The resulting lacquer composition could be stored for many months without showing substantial flocculation or striation. More than 7.0 percent can also be added with good results.

Example III

To a series of samples of the basic lacquer composition of Example I varying quantities of ethyl cellulose were added. It was found that when 4.0 percent or more of the ethyl cellulose is added the titanium dioxide pigment flocculates and striated coating compositions are obtained, which compositions are substantially useless for purposes of obtaining exacting color matches.

When other lacquer compositions, utilizing other types of nitrocellulose, other phthalocyanine pigments, plasticizers, resins and/or solvents, are substituted for the composition of Example I and benzyl cellulose added to such compositions, non-striating, non-flocculating compositions, useful as automotive finishes and for other purposes, are obtained.

It will be apparent to those skilled in the art that the forms of the invention herein disclosed are merely by way of example or illustration. It will also be apparent that numerous variations and modifications may be made therein without departing from the spirit or scope of the invention as defined in the appended claims.

I claim:

1. A lacquer composition consisting essentially of nitrocellulose, a solvent therefor, at least one phthalocyanine pigment, and from about 0.2 percent to about 7.0 percent by weight of benzyl cellulose, based on the total weight of the composition, said composition being characterized by its non-flocculating and non-striating properties after preparation and after extended periods of storage.

2. The composition of claim 1 wherein the benzyl cellulose has a specific gravity of about 1.230 and a melting point of about 148° C. to 155° C.

References Cited in the file of this patent

UNITED STATES PATENTS

| 1,860,532 | Ensminger | May 31, 1932 |
| 1,915,085 | Bren | June 20, 1933 |
| 1,983,006 | Schladebach et al. | Dec. 4, 1934 |
| 2,173,445 | Zapp | Sept. 19, 1939 |
| 2,602,756 | Hucks | July 8, 1952 |

FOREIGN PATENTS

| 27,177 | Australia | 1930 |
| 829,550 | France | June 29, 1938 |

OTHER REFERENCES

"Handbook of Plastics," Simonds & Ellis (1943), p. 744.